United States Patent
Brooks et al.

(10) Patent No.: US 12,224,704 B2
(45) Date of Patent: Feb. 11, 2025

(54) HEAT RECOVERY SYSTEM

(71) Applicant: Enertopia Corp., Kelowna (CA)

(72) Inventors: Barry Richard Brooks, Pilot Hill, CA (US); Albert Clark Rich, Carmichael, CA (US); Mark E. Snyder, Poway, CA (US)

(73) Assignee: Enertopia Corp., Kelowna (CA)

( * ) Notice: Subject to any disclaimer, the term of this patent is extended or adjusted under 35 U.S.C. 154(b) by 0 days.

(21) Appl. No.: 17/751,305

(22) Filed: May 23, 2022

(65) Prior Publication Data

US 2022/0376653 A1     Nov. 24, 2022

Related U.S. Application Data

(60) Provisional application No. 63/192,442, filed on May 24, 2021.

(51) Int. Cl.
    *H02S 40/42*    (2014.01)
(52) U.S. Cl.
    CPC .................................. *H02S 40/425* (2014.12)
(58) Field of Classification Search
    CPC ........ H02S 40/42; H02S 40/425; H02S 40/44; H01L 31/0521
    See application file for complete search history.

(56) References Cited

U.S. PATENT DOCUMENTS

| | | | |
|---|---|---|---|
| 9,608,562 | B2 | 3/2017 | Moochikootathil |
| 2008/0135094 | A1* | 6/2008 | Corrales ................. H02S 40/42 136/259 |
| 2010/0051088 | A1 | 3/2010 | Levin |
| 2013/0019946 | A1 | 1/2013 | Kim et al. |
| 2013/0146122 | A1 | 6/2013 | Chung |
| 2014/0007919 | A1 | 1/2014 | Brottier et al. |
| 2015/0353379 | A1* | 12/2015 | Lee ..................... H02S 40/425 203/21 |

(Continued)

FOREIGN PATENT DOCUMENTS

| | | | | |
|---|---|---|---|---|
| CN | 102683465 A | * | 9/2012 | |
| DE | 4236603 A1 | * | 5/1993 | ............... F24J 2/464 |
| EP | 2262004 A1 | * | 12/2010 | ............. H02S 40/44 |

(Continued)

OTHER PUBLICATIONS

DE-4236603-A1 English machine translation (Year: 1993).*

(Continued)

*Primary Examiner* — Andrew J Golden
(74) *Attorney, Agent, or Firm* — Mintz Levin Cohn Ferris Glovsky and Popeo, P.C.

(57) ABSTRACT

A waste heat recovery system for a photovoltaic panel may include an open loop system and a closed loop system. The open loop system includes an electric insulator layer and a moisture collection layer. The moisture collection layer may collect moisture from condensation and to direct moisture away from the photovoltaic panel. The closed loop system may be positioned adjacent to the open loop system. The closed loop system may include a liquid transfer mat that has a plurality of tubes through which a liquid passes to absorb heat from the photovoltaic panel. The open loop system is configured to encourage heat transfer from the photovoltaic panel to the closed loop system.

26 Claims, 10 Drawing Sheets

(56) References Cited

U.S. PATENT DOCUMENTS

2017/0263789 A1\* 9/2017 Simpson ................ H02S 40/42

FOREIGN PATENT DOCUMENTS

| JP | 2000022193 A | \* | 1/2000 | | |
|----|--------------|---|--------|---|---|
| JP | 2014011238 A | | 1/2014 | | |
| WO | WO-2015070295 A1 | | 5/2015 | | |
| WO | WO-2020099950 A1 | \* | 5/2020 | ............. | H02S 40/42 |
| WO | WO-2020157290 A1 | \* | 8/2020 | ............. | H02S 40/44 |

OTHER PUBLICATIONS

JP-2000022193-A English machine translation (Year: 2000).\*
CN-102683465-A English machine translation (Year: 2012).\*
International Search Report and Written Opinion for PCT/US2022/30573, mailed on Sep. 1, 2022.

\* cited by examiner

HEAT RECOVERY SYSTEM

CROSS-REFERENCE TO RELATED APPLICATIONS

The present application claims priority to U.S. Provisional Application No. 63/192,442, filed May 24, 2021, and entitled Heat Recovery System, the entirety of which is incorporated by reference herein.

FIELD

The current subject matter described herein relates generally to techniques for waste heat recovery and more particularly to a waste heat recovery system for a photovoltaic panel.

BACKGROUND

Generally, photovoltaic panels, such as solar panels, absorb solar energy and convert the solar energy into electrical energy. However, photovoltaic panels can become very hot. Operating at such high temperatures can cause the photovoltaic panels to rapidly degrade, and to inefficiently convert the solar energy into electrical energy. In some instances a carrier may be used that includes a fluid within the carrier to absorb the heat from the photovoltaic panels. However, such carriers may inefficiently reduce the heat of the photovoltaic panels, may slowly reduce the heat of the photovoltaic panels, may be prone to collapsing, may leak, may be difficult to install, and/or may otherwise fail.

SUMMARY

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

According to some aspects, a waste heat recovery system for a photovoltaic panel includes an open loop system and a closed loop system. The open loop system includes an electric insulator layer and a moisture collection layer. The moisture collection layer is configured to collect moisture from condensation and to direct moisture away from the photovoltaic panel. The closed loop system is positioned adjacent to the open loop system. The closed loop system includes a liquid transfer mat having a plurality of tubes through which a liquid passes to absorb heat from the photovoltaic panel. The open loop system is configured to encourage heat transfer from the photovoltaic panel to the closed loop system to reduce a temperature of the photovoltaic panel.

In some aspects, the electric insulator layer comprises a thermoplastic membrane.

In some aspects, the system includes the photovoltaic panel. The open loop system is positioned between the closed loop system and the photovoltaic panel. In some aspects, the photovoltaic panel comprises a first side configured to absorb solar energy and a second side opposite the first side. The open loop system is configured to contact the second side of the photovoltaic panel.

In some aspects, the moisture collection layer comprises an open cell dense foam.

In some aspects, the moisture collection layer comprises a porous reticulated foam.

In some aspects, the system includes a drip system. The drip system may be a low volume water drip line. The drip system may be coupled to the moisture collection layer. The drip system may be configured to allow remove the absorbed moisture to passively flow from the moisture collection layer. The drip system may be at least partially embedded within the moisture collection layer. The drip system may include a nozzle configured to allow the absorbed moisture to flow from the moisture collection layer. The nozzle may be positioned inset relative to an outer end of the electric insulator layer.

In some aspects, the liquid transfer mat comprises a flexible material and/or a rigid material.

In some aspects, the system includes a backing layer. The backing layer may include an insulation material having a low thermal conductivity value. The backing layer may support the liquid transfer mat. The backing layer may be configured to support the closed loop system. The backing layer may be configured to support the open loop system.

According to some aspects, a waste heat recovery system for a photovoltaic panel includes a moisture collection layer and a closed-loop liquid transfer layer. The moisture collection layer may include an open cell material configured to absorb moisture. The closed-loop liquid transfer layer may include a plurality of tubes through which a liquid passes. The moisture collection layer is configured to improve heat transfer from the photovoltaic panel to the closed-loop liquid transfer layer. In some aspects, the system also includes an electric insulator layer configured to separate the moisture collection layer from the photovoltaic panel.

According to some aspects, a waste heat recovery layer for a waste heat recovery system may reduce a temperature of a photovoltaic panel. The waste heat recover layer may include a moisture collection layer and an electric insulator layer. The moisture collection layer may include an open cell material configured to absorb moisture. The electric insulator layer may separate the moisture collection layer from the photovoltaic panel. The moisture collection layer is configured to reduce the temperature of the photovoltaic panel and improve heat transfer from the photovoltaic panel.

According to some aspects, a method of recovering heat from a photovoltaic panel includes providing a waste heat recovery system to a photovoltaic panel, the waste heat recovery system including a moisture collection layer and an electric insulator layer. The method may also include providing a liquid transfer mat.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
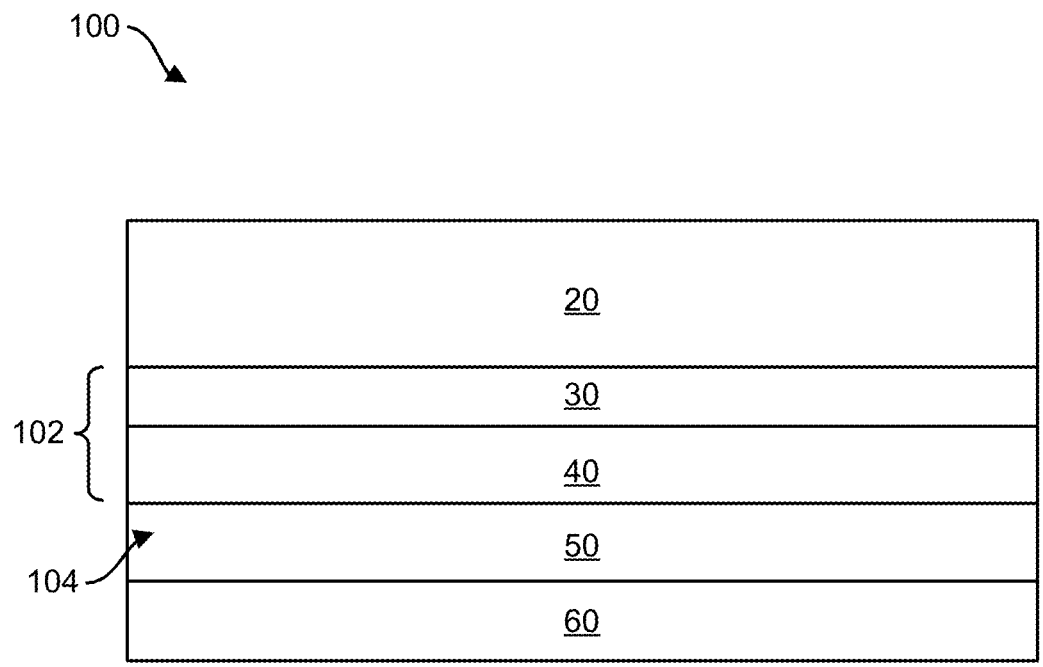
FIG. 1 illustrates schematically illustrates a heat recovery system consistent with implementations of the current subject matter.

Generally, photovoltaic panels, such as solar panels, absorb solar energy and convert the solar energy into electrical energy. However, photovoltaic panels can become very hot, especially in climates that are very dry and warm, such as desert climates. Operating at high temperatures can cause the photovoltaic panels to rapidly degrade, and to convert the solar energy into electrical energy less efficiently. Thus, operating photovoltaic panels at high temperatures may cause the panels to be replaced or repaired more often.

For example, photovoltaic panels convert solar energy into useful electrical current. The photovoltaic panels may be rated convert the solar energy into electrical energy at a rate of 15-20% effectiveness. The remaining solar energy (e.g., the solar energy that is not converted into electrical energy) is converted into heat, which may reduce performance of the photovoltaic panel, degrade the photovoltaic panel, and/or reduce a lifespan of the photovoltaic panel. In some instances, the optimal temperature for a face of a photovoltaic panel is 77 degrees Fahrenheit. Every degree (e.g., 1° F., 1.8° F., and/or the like) above 77 degrees Fahrenheit reduces the current output of the panel by approximately 0.5% to 1%. In some instances, 50% of the unused conversion energy transfers to the back of the photovoltaic panel and 50% of the unused conversion energy dissipates off the face of the photovoltaic panel. The temperature of the back face of the photovoltaic panel may thus reach at least 50 degrees higher than the optimal temperature (e.g., 140 degrees Fahrenheit or higher).

Such circumstances may be is especially true in hot dry climates, where the difference in temperature can be 75 degrees between night and day temperatures. With it being common for photovoltaic panels to reach temperatures of 137° F., a solar array being 60° F. greater into the heat stress zone would equal a decrease of 15% or more on the output. Nevertheless, regardless of the geographic location of the photovoltaic panel and the time of year, waste heat is produced when solar energy is converted into electrical energy. With over 1.2 TW (Terawatts) of worldwide photovoltaic panel installed capacity, and another 100 Gigawatts of photovoltaic panel capacity coming online per year, the inefficiencies that are currently experienced due to overheating are quite extensive, and expensive. Accordingly, the waste heat reduces performance of the photovoltaic panel, degrades the photovoltaic panel, reduces an output of the photovoltaic panel, and/or reduces a lifespan of the photovoltaic panel.

The heat recovery system (e.g., a waste heat recovery system) consistent with implementations of the current subject matter may reduce the operating temperature of the photovoltaic panels, by for example, quickly and efficiently recovering, transferring, extracting, and/or collecting heat from the photovoltaic panels. Thus, the heat recovery system described herein may extend the lifespan of the photovoltaic panels, reduce degradation of the photovoltaic panels, increase an output of the photovoltaic panels, remove or reduce heat stress associated with running photovoltaic panels in hot, arid regions, and/or the like.

In some instances, systems for reducing a temperature of a photovoltaic panel are used in residential settings. For example, the systems may be applied using a swimming pool as a heat sink to reduce the temperature of the photovoltaic panel. However, such systems may inefficiently reduce the temperature of the photovoltaic panel, and may not be used in certain climates, such as desert climates, where a large amount of water to cool the panel is scarce. The heat recovery system consistent with implementations of the current subject matter may be used in such climates, such as desert climates, without using a large amount of a liquid, such as water. The heat recovery system may additionally and/or alternatively be used with large commercial arrays of photovoltaic panels, in residential systems and/or the like. The heat recovery system described herein may additionally and/or alternatively more efficiently extract and/or transfer heat from the photovoltaic panel to rapidly cool the photovoltaic panel. The efficient extraction of heat from the photovoltaic panel may also cause more efficient heating of a liquid in a liquid transfer system that may be used for other systems, such as heat processing systems, air conditioning systems, pool heating systems, area heating systems, agricultural processes, lithium processing systems, and/or the like.

In some instances, affixing a liquid carrying structure and/or a body of water directly to the back of a photovoltaic panel may be problematic, as the current producing components may contact moisture, causing the photovoltaic panel to short or otherwise fail. The heat transfer system described herein may include an insulation layer between the photovoltaic panel and the moisture or liquid carrying components (e.g., liquid heat transfer components), to help limit or prevent failure of the photovoltaic panel.

Additionally and/or alternatively, certain liquid heat transfer systems used to reduce a temperature of a photovoltaic panel may use a liquid that has a low temperature. However, as noted above, the photovoltaic panels may become very hot, especially in hot climates. Such photovoltaic panels may also experience drastic temperature changes each day and night. Thus, the photovoltaic panels may undergo thermal shock when a cool liquid transfer system contacts the photovoltaic panel, thereby causing the photovoltaic panel to fail. The heat recovery system consistent with implementations of the current subject matter provides an open loop system that helps to prevent or limit thermal shock, and thus failure, of the photovoltaic panel. For example, the open loop system separates the liquid transfer systems that may include a cool liquid from the photovoltaic panel, while still rapidly encouraging and/or extracting heat from the photovoltaic panel and directing the heat to the liquid transfer systems.

Generally, moisture that exists in air is measured as grains of moisture per pound of dry air. At the point of saturation (e.g., when air cannot retain moisture known as dew point), water forms on cool surfaces. This process may generally occur at night. During the heat of the day, as ambient hot air pulls moisture from surrounding environments, moisture will also form on cool surfaces. The heat recovery system consistent with implementations of the current subject matter may additionally and/or alternatively take advantage of these conditions. For example, fluid may improve the transfer of heat from the back of the photovoltaic panel into the liquid transfer system. The heat recovery system described herein may collect and/or retain the moisture formed at dew point temperatures.

For example, a moisture collection layer, such as a foam layer, a metal layer, and/or the like, may collect and/or retain the moisture formed at dew point temperatures. The moisture collection layer may be positioned between the photovoltaic panel and the liquid transfer system to facilitate the rapid transfer of heat from the photovoltaic panel to the liquid transfer system. In some instances, during periods when, due to surrounding ambient conditions, moisture will not naturally form, the heat recovery system described herein may employ a controlled water emitting means to insure saturation of the moisture collection layer. Thus, the heat recovery system described herein may rapidly and efficiently take advantage of ambient environment and temperatures to facilitate and improve heat transfer from the photovoltaic panel, thereby improving efficiency of the photovoltaic panel, reducing degradation of the panel, and improving a lifespan of the panel. Additionally and/or alternatively the moisture collection layer may feed an agriculture or drip system that allows for irrigation of plants, such as in environments where a large amount of water for irrigating the plants is limited.

Additionally and/or alternatively, the heat recovery system consistent with implementations of the current subject matter may be installed onto existing solar farms or photovoltaic panels. For example, the system may enable the installation of liquid transfer systems and backing insulation over one or multiple photovoltaic panels.

Accordingly, the heat recovery system 100 described herein may result in photovoltaic output levels of 10% or greater, may remove or reduce heat stress on and/or failure of the photovoltaic panels, and/or the like.

FIG. 1 schematically illustrates a heat recovery system 100, consistent with implementations of the current subject matter. The heat recovery system 100 may include an energy dissipating receiver 20, an open loop system 102, and/or a closed loop system 104. In some implementations, the heat recover system 100 includes the open loop system 102, which may be used with the energy dissipating receiver 20 and/or the closed loop system 104. The open loop system 102 may include an insulator layer 30, such as an electric insulator layer, and/or a heat transfer layer 40, which may be referred to herein as a moisture collection layer 40. The closed loop system 104 may include a liquid transfer system or mat 50. The heat recovery system 100 may additionally and/or alternatively include a backing layer 60, such as an insulation layer. The open loop system 102 may be positioned between the energy dissipating receiver 20 and the closed loop system 104. Thus, the open loop system 102 may facilitate and/or improve a transfer of heat from the energy dissipating receiver 20 to the closed loop system 104.

In some implementations, the open loop system 102 collects and/or retains moisture, such as water or another liquid, and allows the moisture to escape, and/or be passively transferred out of the open loop system 104. For example, the open loop system 102 may allow for the moisture to flow to an agricultural irrigation system, the environment, and/or the like. Additionally and/or alternatively, the closed loop system 104 includes a heat transfer fluid, such as water, a refrigerant, antifreeze, and/or the like. The heat transfer fluid may flow through the closed loop system 104 to absorb heat from, for example, the energy dissipating receiver 20. Once the heat transfer fluid absorbs the heat, the heated heat transfer fluid may be directed to another system, such as a warmed fluid processing system including a pool, an air conditioning system, a space heating system, a hot water processing system, an agricultural system, a bathroom, a dishwasher, and/or the like, and/or be redirected through the closed loop system 104. The warmed fluid may be thus be pre-heated, allowing the warmed fluid to be used for agricultural purposes. The open loop system 102 may thus improve heat transfer from the energy dissipating receiver 20 to, for example, the heat transfer fluid passing through and/or contained within closed loop system 104. Such configurations may desirably improve the efficiency and life expectancy of the energy dissipating receiver 20 and reduce degradation of the energy dissipating receiver 20.

Figure 2:
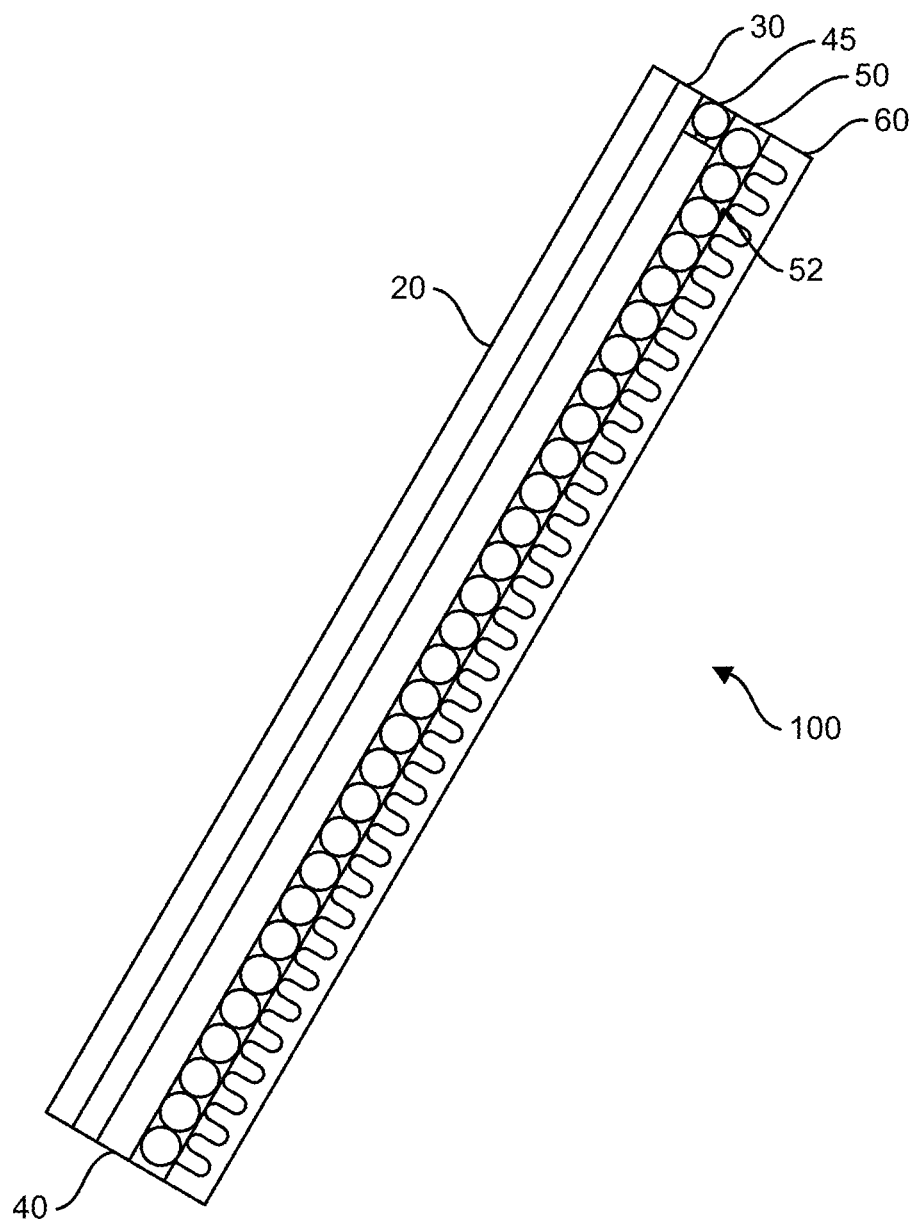
FIG. 2 illustrates a side cross-sectional view of a heat recovery system consistent with implementations of the current subject matter.

FIG. 2 schematically illustrates an example of the heat recovery system 100 consistent with implementations of the current subject matter. As shown in FIG. 2, the heat receiver system 100 may include or be coupled to the energy dissipating receiver 20. The energy dissipating receiver 20 may include a photovoltaic ("PV") panel, such as a solar panel and/or a photovoltaic-thermal panel. For example, the energy dissipating receiver 20 may generate thermal energy and/or electrical energy by converting absorbed solar energy into the thermal energy and/or the electrical energy. In some implementations, the generated thermal energy and/or electrical energy may be used to heat water, a refrigerant, and/or antifreeze, heat pool water, feed air conditioning systems, a lithium processing and/or extraction systems, battery management systems (e.g., stored in batteries), and/or the like.

In some implementations, the energy dissipating receiver 20 includes a first side 22 configured to absorb solar energy, and a second side 24 opposite the first side. The open loop system 102 may contact and/or be positioned adjacent to the second side (or back side) of the energy dissipating receiver 20. This allows for the open loop system 102 to efficiently extract and/or otherwise facilitate transfer of the heat emitted from the energy dissipating receiver 20 (such as from the back or second side 24). This may additionally and/or alternatively reduce a temperature of the energy dissipating receiver 20 and/or to collect the heat emitted from the energy dissipating receiver 20.

Figure 3:
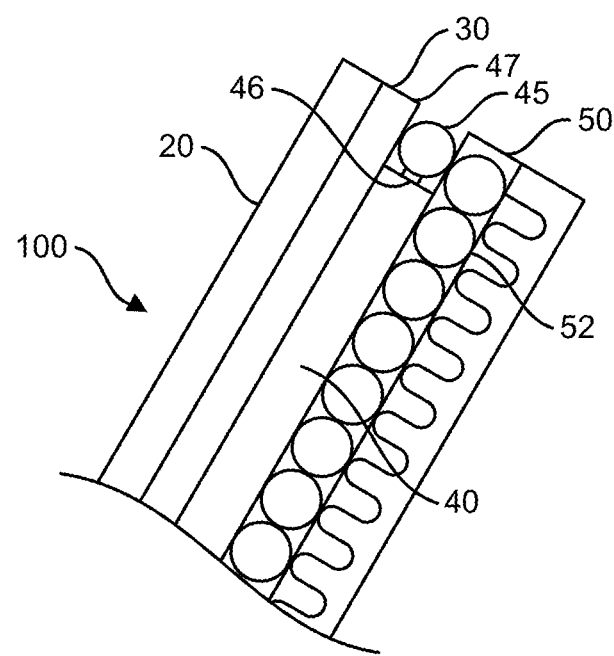
FIG. 3 illustrates a portion of a side cross-sectional view of a heat recovery system consistent with implementations of the current subject matter.

Referring to FIGS. 2 and 3, the open loop system 102 may include an insulator layer 30 and/or a moisture collection layer 40. The insulator layer 30 may include an electric insulation material. For example, the insulator layer 30 may include a thermoplastic membrane, such as a nonpolar thermoplastic membrane. The insulator layer 30 may additionally and/or alternatively include a fire and/or flame retardant material. The fire and/or flame retardant material may form a part of the insulator layer 30 and/or may be coupled to the insulator layer 30, such as via a spray, a coating, and/or the like. For example, the fire and/or flame retardant material may be Class B rated by the fire code. The insulator layer 30 may thus help to insulate the electrical components of the energy dissipating receiver 20 from the moisture and/or fluid of the moisture collection layer 40 and/or the closed loop system 104, thereby preventing or limiting failure of the energy dissipating receiver 20.

In some implementations, the insulator layer 30 may include a material that has a high thermal conductivity. This allows for efficient and effective heat transfer through the insulator layer 30 to the closed loop system 104, such as to the liquid transfer mat or system 50.

The insulator layer may be positioned between the energy dissipating receiver 20 and at least a portion of the open loop system 102, such as the moisture collection layer 40, and/or at least a portion of the closed loop system 104, such as the liquid transfer system 50. Such configurations separates the moisture producing and/or containing components of the heat recovery system 100 from the energy dissipating receiver 20. For example, this helps to insulate the electrical components of the energy dissipating receiver 20 from the moisture and/or fluid of the moisture collection layer 40 and/or the closed loop system 104, thereby preventing or limiting failure of the energy dissipating receiver 20.

Referring again to FIGS. 2 and 3, the moisture collection layer 40 may collect moisture from condensation and/or direct moisture away from the energy dissipating receiver 20. For example, as described herein, at the point of saturation (e.g., when air cannot retain moisture known as dew point), water forms on cool surfaces, such as on one or more surfaces of the energy dissipating receiver 20 (e.g., the second side 24), one or more surfaces of the liquid transfer mat 50, and/or one or more surfaces of the moisture collection layer 40. This process may generally occur at night, during the morning, and/or during cooler days. During the heat of the day, as ambient hot air pulls moisture from surrounding environments, moisture will also form on the cool surfaces. The moisture collection layer 40 may take advantage of these conditions. For example, the moisture collection layer 40 may absorb or otherwise collect the moisture formed on the one or more surfaces of the energy dissipating receiver 20, the liquid transfer mat 50, and/or the moisture collection layer 40. The collected moisture stored within the moisture collection layer 40 may help to improve thermal conductivity and heat transfer between the energy dissipating receiver 20 and the liquid transfer mat 50. For example, the collected moisture may facilitate rapid heat transfer from the energy dissipating receiver 20. This helps to quickly reduce a temperature of the energy dissipating receiver 20 to allow the energy dissipating receiver 20 to operate at a lower temperature, thereby extending the lifespan of the energy dissipating receiver 20, reducing or preventing degradation of the energy dissipating receiver 20, and/or improving the efficiency of the energy dissipating receiver 20.

In some implementations, the moisture collection layer 40 helps to prevent or limit thermal shock of the energy dissipating receiver 20 that would otherwise occur when a cold surface or liquid directly contacts the energy dissipating receiver 20. For example, the material of the moisture collection layer 40 may contain the absorbed moisture without allowing the moisture to get too cold. The moisture collection layer 40 may additionally and/or alternatively provide some barrier between the liquid transfer mat 50 and the energy dissipating receiver 20, to prevent or limit the impact of the initially cold fluid passing through the liquid transfer mat 50 on the energy dissipating receiver 20. The moisture collection layer 50 may additionally and/or alternatively prevent the energy dissipating receiver 20 from cracking and/or freezing, such as during circumstances when there are large temperature changes.

Consistent with implementations of the current subject matter, the moisture collection layer 40 may form a part of the open loop system 102. As part of the open loop system 102, the moisture collected and/or absorbed by the moisture collection layer 40 may be delivered (e.g., passively, actively, and/or the like) to an agricultural system, such as an irrigation system, to the environment, and/or the like. Such configurations may be useful in environments, such as deserts, in which water for irrigation is not readily available. For example, the moisture collection layer 40 may absorb moisture formed on one or more surfaces of the heat recovery system 100. The absorbed moisture may be used as part of an agricultural system.

The moisture collection layer 40 (e.g., the heat transfer layer 40) may include an absorbent material. The moisture collection layer 40 (e.g., the heat transfer layer 40) may include a foam, a metal, a metallic honeycomb, a metallic mesh, an aluminum mesh, mineral wool, and/or the like. For example, the moisture collection layer 40 may include a foam, such as an open cell dense foam, a porous material, a porous reticulated foam, and/or the like. The material of the moisture collection layer 30 may additionally and/or alternatively be fire retardant and/or have a high thermal conductivity. This allows for efficient and effective heat transfer through the insulator layer 30 to the closed loop system 104, such as to the liquid transfer mat or system 50, to, for example, rapidly reduce a temperature of the energy dissipating receiver 20 and/or rapidly heat the fluid flowing through the liquid transfer mat or system 50.

In some implementations, the moisture collection layer 40 has a thickness that allows for an optimal amount of moisture collection, while maintaining a high thermal conductivity to facilitate rapid heat transfer between the energy dissipating receiver 20 and the liquid transfer mat 50. For example, the moisture collection layer 40 may have a thickness of approximately 0.25 to 0.5 inches, 0.1 to 0.2 inches, 0.2 to 0.3 inches, 0.3 to 0.4 inches, 0.4 to 0.5 inches, 0.5 to 0.6 inches, 0.6 to 0.7 inches, 0.7 to 0.8 inches, 0.8 to 0.9 inches, 0.9 to 1.0 inches, and/or other ranges therebetween, greater, or lower.

As an example, as shown in FIGS. 2 and 3, the heat recovery system 100 may include a drip system 45. The drip system 45 may allow moisture to escape from the moisture collection system 40 and/or may remove moisture stored within the moisture collection system. For example, the drip system 45 may include a drip line, such as a low volume water drip line or other irrigation system. The drip system 45 may be passive, such that the moisture stored within the moisture collection layer 40 passively escapes and/or otherwise flows from the moisture collection layer 40. Additionally and/or alternatively, the drip system 45 may be active, such that the moisture stored within the moisture collection layer 40 is actively (e.g., via a pump) transferred from the moisture collection layer 40. The drip system 45 may provide for a microenvironment for herbs or high value small crops that can grow behind the energy dissipating receiver 20, such as in cool areas behind the energy dissipating receiver 20. This allows for irrigation to be used and/or for plants to be grown in environments that would otherwise not be hospitable to such growth.

In some implementations, the drip system 45 may be coupled to the moisture collection layer 40. For example, at least a portion 46 of the drip system 45, such as a drip line, a nozzle, and/or the like, of the drip system 45 is at least partially embedded within, adhered to, mechanically fastened to, and/or otherwise coupled to the moisture collection layer 40. This allows for the moisture stored within the moisture collection layer 40 to flow from the moisture collection layer 40 to the drip system 45. In some implementations, embedding the portion 46 of the drip system 45 within the moisture collection layer 40 helps to insure saturation of the moisture collection layer 40 and/or facilitates transfer of the moisture from the moisture collection layer 40 to the drip system 45.

Referring to FIG. 2, at least a portion of the drip system 45, such as the embedded portion 46 of the drip system 45, may be positioned inset relative to a lateral and/or outer end 47 of the insulator layer 30. This allows for the drip system 45 and/or the connection between the drip system 45 (e.g., at the portion 46) and the moisture collection layer 40 to be separated from the energy dissipating receiver 20. This helps to prevent the electrical components of the energy dissipating receiver 20 from contacting the moisture containing components of the heat recovery system 100, to prevent failure of the energy dissipating receiver 20.

In some implementations, the moisture collection layer 40 is coupled to (e.g., adhered to, fastened to, and/or the like) the insulator layer 30. Together and/or separately, the moisture collection layer 40 and the insulator layer 30 may be rolled into place. For example, the moisture collection layer 40 and/or the insulator layer 30 may be rolled over or otherwise coupled to at least one side of the energy dissipating receiver 20 and/or the liquid transfer mat 50. This allows for easy and fast installation of the moisture collection layer 40 and/or the insulator layer 30. Additionally and/or alternatively, the moisture collection layer 40 and/or the insulator layer 30 may be modular. The modular design may allow for easier and quicker installation, such as in large grid scale systems that include many photovoltaic panels. Additionally and/or alternatively, the moisture collection layer 40 and/or the insulator layer 30 may include an adhesive, such as a peel-and-stick adhesive that allows for one or more of the layers to be coupled to one another, the energy dissipating receiver 20, and/or the liquid transfer mat 50 quickly and easily.

Figure 4:
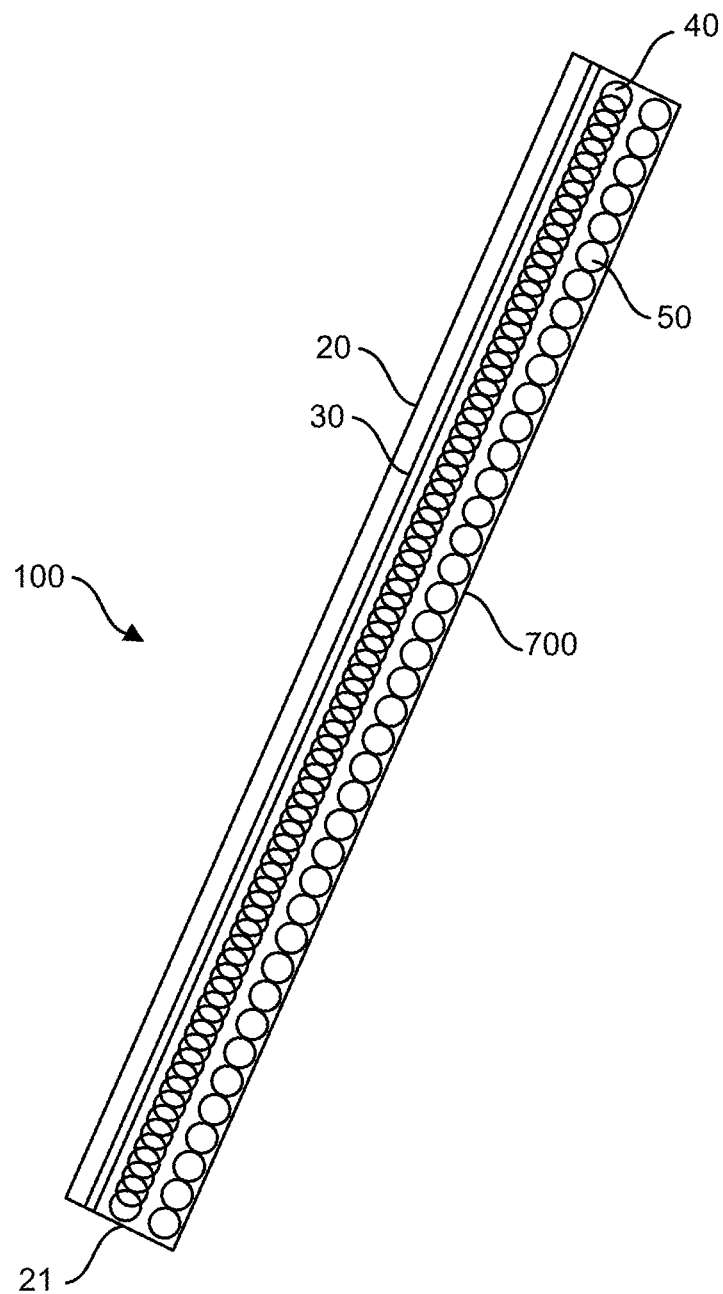
FIG. 4 illustrates a side cross-sectional view of a heat recovery system consistent with implementations of the current subject matter.
Figure 5:
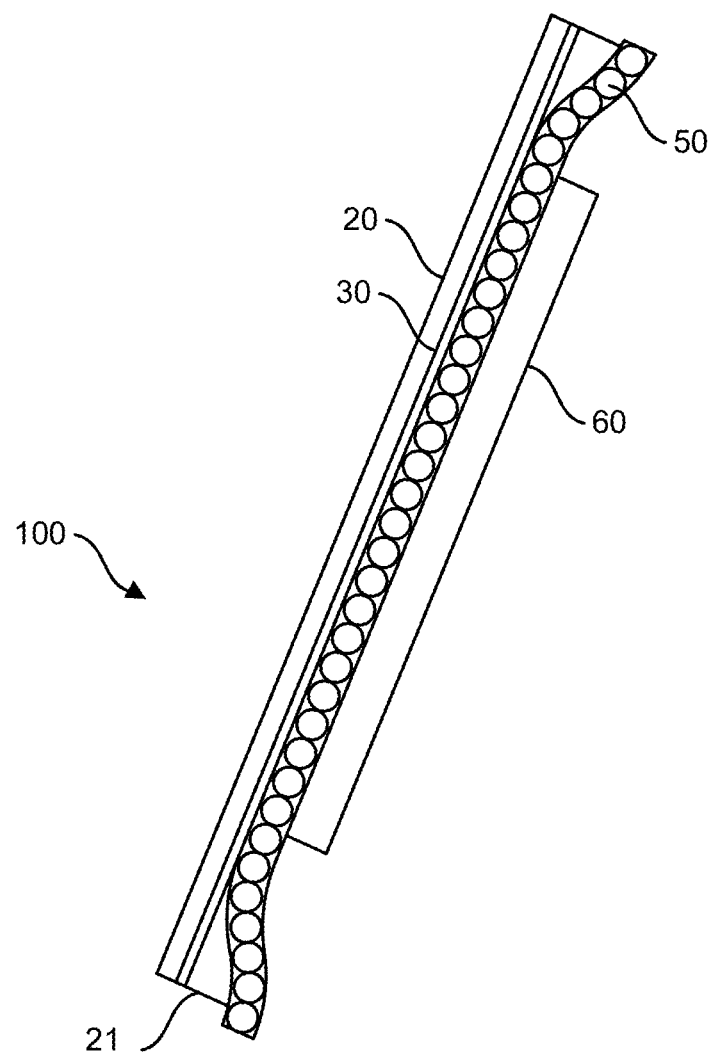
FIG. 5 illustrates a side cross-sectional view of a heat recovery system consistent with implementations of the current subject matter.

FIG. 4 and FIG. 5 illustrate another example of the heat recovery system 100, which may be the same as or similar to the heat recovery system 100 shown in FIGS. 2 and 3, and may include one or more components that may be used with and/or interchanged with one or more components of the heat recovery system 100 shown in FIGS. 2 and 3. The heat recovery system 100 may include the energy dissipating receiver 20, the liquid transfer mat 50, and the insulation layer 30, as described herein. The heat recovery system 100 shown in FIGS. 4 and 5 may additionally and/or alternatively include the heat transfer layer 40. In some implementations, the heat transfer layer 40 is dry, such that it may not collect moisture and/or may collect a limited amount of moisture, such as condensation and/or dew formed on the energy dissipating receiver 20. The heat transfer layer 40 may improve cooling of the energy dissipating receiver 20, by, for example, encouraging and/or improving heat transfer between the energy dissipating receiver 20 and the liquid transfer mat 50. Consistent with implementations of the current subject matter, the heat transfer layer 40 may include a foam, a metal, a metallic honeycomb, a metallic mesh, an aluminum mesh, mineral wool, and/or the like.

FIG. 5 illustrates an example of the heat recovery system 100 consistent with implementations of the current subject matter. As shown in FIG. 5, the heat recovery system 100 may include a backing layer, such as the backing layer 60 described herein. The backing layer 60 may be applied to the liquid transfer mat 50. The backing layer 60 may be biased towards the liquid transfer mat 50 and/or the energy dissipating receiver 20. The backing layer 60 may press the liquid transfer mat 50 into the heat transfer layer 40 and/or the energy dissipating receiver 20 to improve heat transfer efficiency between the energy dissipating receiver 20 and the liquid transfer mat 50 and/or the heat transfer layer 40.

Further, as shown in FIG. 5, end portions 51A of the liquid transfer mat 50 may be tapered away from a central portion 51B of the liquid transfer mat 50, around the backing layer 60. This allows for the liquid transfer mat 50 to be supported by a frame 211 (e.g., the backing layer 60 or another component) of the energy dissipating receiver 20. This may also allow for at least the central portion of the liquid transfer mat 50 to be pressed against the energy dissipating receiver 20 and/or the heat transfer layer 40, while eliminating and/or limiting kinks from forming in the liquid transfer mat 50. Accordingly, such configurations may maximize flow rates within the liquid transfer mat 50, which further encourages heat transfer away from the energy dissipating receiver 20.

Figure 9:
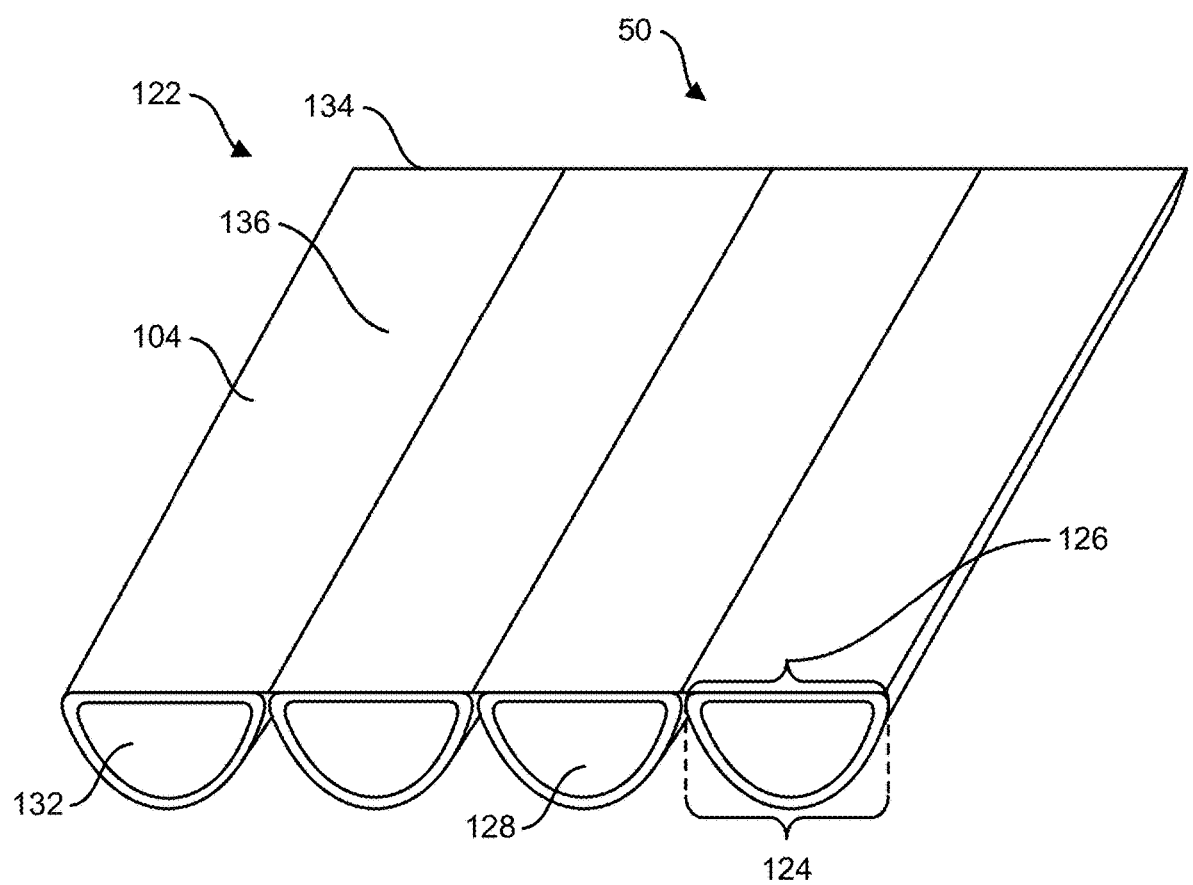
FIG. 9 illustrates an example liquid transfer mat consistent with implementations of the current subject matter.

Consistent with implementations of the current subject matter, the moisture collection layer 40 facilitates heat transfer from the energy dissipating receiver 20 (e.g., the PV panel) to the closed loop system 104, such as to the liquid transfer system or mat 50. Referring to FIG. 9, the liquid transfer mat 50 may include a plurality of tubes through which a heat transfer fluid (e.g., a liquid such as water, antifreeze, a refrigerant, and/or the like) passes. The heat transfer fluid may absorb the heat transferred, extracted, and/or removed from the energy dissipating receiver 20. The heat transfer fluid may be recycled within the liquid transfer mat 50, for example, as part of the closed loop system 104. For example, the heat transfer fluid may absorb the heat from the energy dissipating receiver 104, may eject the heat (e.g., as part of a downstream system, such as an air conditioning system, a space heating system, a pool, a heat processing system, a lithium processing or extraction system, and/or the like), and be recycled within or returned to the liquid transfer mat 50. As an example, the heat from the heated heat transfer fluid may be used for heating during lithium brine processing to reach desired ambient temperatures of 122 to 140 degrees Fahrenheit. The heat transfer fluid may be held within storage tanks coupled to the liquid transfer mat 50 and/or may be returned to the liquid transfer mat 50.

The liquid transfer mat 50 may include at least one absorption tube absorption tube 52. The absorption tube 52 may form all or a part of the liquid transfer mat 50. The absorption tube 52 may encourage a transfer of heat to a heat transfer fluid flowing through the absorption tube 52. For example, the absorption tube 52 may encourage a transfer of heat from the energy dissipating receiver 20 to the fluid flowing through the absorption tube 52.

Figure 6:
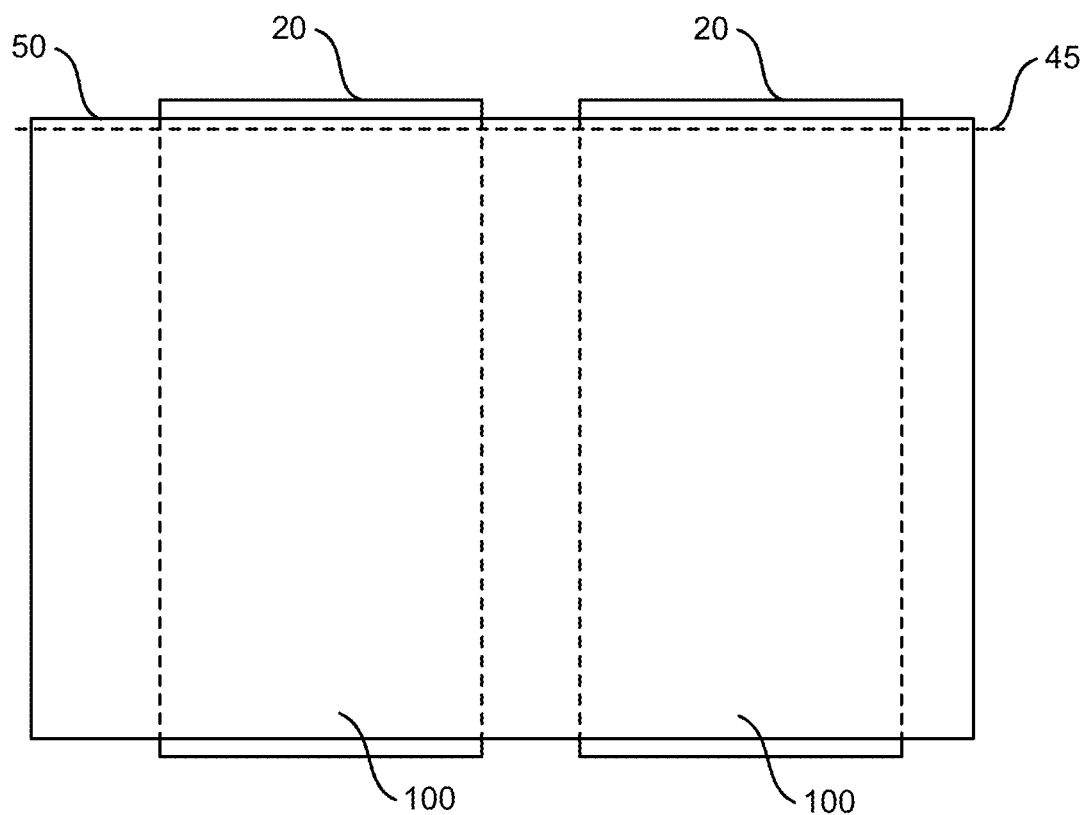
FIG. 6 illustrates a top view of a heat recovery system consistent with implementations of the current subject matter.

In some implementations, the absorption tube 52 may extend in a direction that is perpendicular relative to the energy dissipating receiver 20. For example, the energy dissipating receiver 20 may be oriented in a first direction, and the absorption tube 52 (as part of the liquid transfer mat 50) may be oriented in a second direction that is perpendicular to the first direction. In some implementations, the absorption tube 52 may extend in a direction that is approximately 90 degrees, 180 degrees, 270 degrees and/or parallel to the direction of the energy dissipating receiver 20. For example, FIG. 6 illustrates an example of the heat recovery system 100 consistent with implementations of the current subject matter, in which two energy dissipating receivers 20 are positioned over a single heat recovery system 100, including the open and/or closed loop systems 102, 104.

Consistent with implementations of the current subject matter, while the energy dissipating receiver 20 may be described herein as including a single panel, the energy dissipating receiver 20 may include a plurality of panels (e.g., 2, 3, 4, 5, 10, 50, 100, 500, 1000, or more panels, and/or other ranges therebetween or greater). Each panel may be positioned over and/or coupled to separate open loop systems 102 and/or closed loop systems 104. Each panel may additionally and/or alternatively be positioned over and/or be coupled to a single open loop system 102 and/or closed loop system 104.

Referring to FIG. 9, the absorption tube 52 may be an elongated tube. For example, the absorption tube 52 may be between 1 to 2 feet long, 2 to 5 feet long, 5 to 10 feet long, 10 to 25 feet long, 25 to 50 feet long, 50 to 100 feet long, 100 to 120 feet long, 120 to 150 feet long, 150 to 200 feet long, and/or other ranges therebetween.

In some implementations, the absorption tube 52 includes an array 122 of absorption tubes 52. The array 122 may include a plurality of absorption tubes 52. The plurality of tubes may be coupled together and/or integrally formed to define the liquid transfer mat 50. The mat may be un-rolled and/or otherwise positioned to install the mat.

For example, the array 122 may include one, two, three, four, five, six, seven, eight, nine, ten, or more absorption tubes 52. As part of the array 122, each of the plurality of absorption tubes 52 may be positioned adjacent to one another. For example, the absorption tubes 52 may include a first end 132, a second end 134, and a tube 136 that extends between the first end 132 and the second end 134. The tube 136 may extend lengthwise between the first end 132 and the second end 134. Each of the tubes 136 may be positioned adjacent to one another and/or may be coupled to one another along the length of the tubes 136. In some implementations, each of the plurality of absorption tubes 52 may be separated by a perforation that allows for tearing of each absorption tube 52 from the array 122.

FIG. 9 illustrates an example of the array 122 of absorption tubes 52, consistent with implementations of the current subject matter. Each absorption tube 52 may include a curved portion 124 and a flat portion 126. The absorption tube 52 may also include a channel 128 extending through a length (e.g., the entire length) of the interior of the absorption tube 52. The channel 128 allows the fluid, such as water, antifreeze, refrigerant, and/or the like, to flow through the absorption tube 52 and absorb the transferred heat from the sun and/or from the energy dissipating receiver 20. Additionally and/or alternatively, each absorption tube 52 may be entirely curved or cylindrical, may be separated by webbing, and/or the like.

Referring again to FIG. 9, the absorption tube 52 includes the curved outer surface or curved portion 124 and the flat outer surface or flat portion 126. The curved portion 124 may have a half-oval, semi-circle, arched and/or otherwise curved shape. The curved portion 124 may have a radius of approximately 0.375 in., 0.1 to 0.2 in., 0.2 to 0.3 in., 0.3 to 0.4 in., 0.4 to 0.5 in., 0.5 to 0.6 in., and/or other ranges therebetween. In some implementations, the flat portion has a length of approximately 1.5 in., 0.5 to 0.75 in., 0.75 to 1.0 in., 1.0 to 1.5 in., 1.5 to 2.0 in., 2.0 to 2.5 in., and/or other ranges therebetween. In some implementations, the curved portion 124 has a length of approximately 1.18 in., 0.8 to 0.9 in., 0.9 to 1.0 in., 1.0 to 1.1 in., 1.1 to 1.2 in., 1.2 to 1.3 in., 1.3 to 1.4 in., and/or the like. The curved portion 124 and the flat portion 126 may be integrally formed. For example, the curved portion 124 and the flat portion 126 may together form a perimeter of the absorption tube 52. Such configuration helps to maintain the structural integrity of the absorption tube 52 and helps to limit or prevent deformation or collapse of the absorption tube 52. Such configurations may also eliminate the need for internal webbing to prevent collapse or deformation of the absorption tube 52.

In some implementations, the curved portion forms greater than or equal to 50% of the perimeter of the absorption tube 52 and the flat portion forms less than or equal to 50% of the perimeter. In some implementations, the curved portion forms greater than or equal to 25% of the perimeter of the absorption tube 52 and the flat portion forms less than or equal to 75% of the perimeter, the curved portion forms greater than or equal to 33.33% of the perimeter of the absorption tube 52 and the flat portion forms less than or equal to 66.66% of the perimeter, the curved portion forms greater than or equal to 45% of the perimeter of the absorption tube 52 and the flat portion forms less than or equal to 55% of the perimeter, the curved portion forms greater than or equal to 55% of the perimeter of the absorption tube 52 and the flat portion forms less than or equal to 45% of the perimeter, the curved portion forms greater than or equal to 66.66% of the perimeter of the absorption tube 52 and the flat portion forms less than or equal to 33.33% of the perimeter, the curved portion forms greater than or equal to 75% of the perimeter of the absorption tube 52 and the flat portion forms less than or equal to 25% of the perimeter, and/or the like.

In some implementations, the absorption tube 52 includes an absorbing or first side and a second side opposite the first side. The first side may be configured to absorb or remove heat and transfer the heat to the heat transfer fluid flowing within the channel 128. In some implementations, the first or absorbing side faces in a direction towards the energy dissipating receiver 20. The first or absorbing side may face in a direction towards and/or may contact the moisture collection layer 40. The perimeter of each tube (e.g., a total length of the curved portion and the flat portion, such as a perimeter of a cross-section of each tube, a perimeter of a side at the first end and/or the second end of each tube, and/or the like) may be approximately 2.68 in., 1.5 to 1.75 in., 1.75 to 2.0 in., 2.0 to 2.25 in., 2.25 to 2.5 in., 2.5 to 2.75 in., 2.75 to 3.0 in., and/or the like. In some implementations, a thickness of the wall of the absorption tube, such as between the exterior surface of the channel and the exterior surface of the absorption tube, is approximately 0.1 to 0.25 in., 0.25 to 0.5 in., 0.5 to 0.75 in., and/or the like. As an example, a total width of the array 122, shown in FIG. 9, including at least four absorption tubes (e.g., a first, second, third, and/or fourth absorption tube) may be approximately 6 inches, although, as described herein other widths are contemplated and may be tuned depending on the available space.

In some implementations, the flat portion 126 defines the absorbing side or the first side. This allows the flat portion 126 to have maximum contact (or surface area in contact) with the moisture collection layer 40, or other flat surface to absorb or release heat to the fluid flowing through the channel 128. Such configurations also provide a maximum heat transfer surface to face towards the energy dissipating receiver 20 and/or contact the moisture collection layer 40, to allow for maximal and/or efficient transfer of heat to the absorption tube 52. In other implementations, the curved portion 124 defines the absorbing side or first side. This allows the curved portion 124 to be directly exposed to moisture collection layer 40 to provide a greater surface area for absorbing heat, allowing the flat portion 126 to be adhered or otherwise coupled to a surface, structure, roof or other structure. Additionally and/or alternatively both sides (e.g., the first and second sides) of the absorption tube 52 are flat and/or curved.

In some implementations, the array 122 of the absorption tubes 52 may be curved along a length of the array. In other words, at least one absorption tube 52 of the array 122 may be pre-formed in a curve or pre-curved between the first end 132 and the second end 134. The curve may include an interior and an exterior. The exterior of the curved absorption tube 52 may contact the moisture collection layer 40 to secure the absorption tube 52 against the moisture collection layer 40. For example, the curve may bias the absorption tube 52 against the moisture collection layer 40. This helps to maintain contact between the absorption tube 52 (or array 122) and the moisture collection layer 40, thereby more efficiently transferring heat from and/or cooling the energy dissipating receiver 20 through the moisture collection layer 40.

The absorption tube 52, including the array 122, may include one or more materials suitable for absorbing heat and/or encouraging heat transfer. For example, the absorption tube 52, including the array 122 may include one or more of a flexible ethylene propylene diene terpolymer ("EPDM"), a rubber, a plastic, a silicon rubber, a thermoplastic with high conductivity, an elastomer compound with a durometer suitable for rounding out, stretching, and/or the like. The absorption tube 52, including the array 122 may additionally and/or alternatively include a rigid material. The material of the absorption tube 52 efficiently transfers heat to the fluid passing through the absorption tube 52.

Referring again to FIGS. 1-9, the heat recovery system 100 may include a backing layer 60. The backing layer may include an insulation material having a low thermal conductivity. The backing layer may prevent or limit heat from escaping the liquid transfer mat 50. Such configurations may help to maximize efficiency of the ability of the fluid flowing within the liquid transfer mat 50 to absorb the heat from the energy dissipating receiver 20 through the insulator layer 30 and/or the moisture collection layer 40. The backing layer 60 may be flexible or rigid depending on the application.

In some implementations, the backing layer 60 is configured to support at least a portion of the heat recovery system 100, such as the open loop system 102 and/or the closed loop system 104. In some implementations, the backing layer 60 includes one or more grooves corresponding to one or more portions of the liquid transfer mat 50 to better support and/or position the liquid transfer mat 50. The backing layer 60 may include one or more features of the backing layer 60 shown in FIGS. 1-8. The backing layer 60 may include a sheet metal tray and/or another tray that supports the liquid transfer mat 50 and/or the energy dissipating panel 20.

Figure 10:
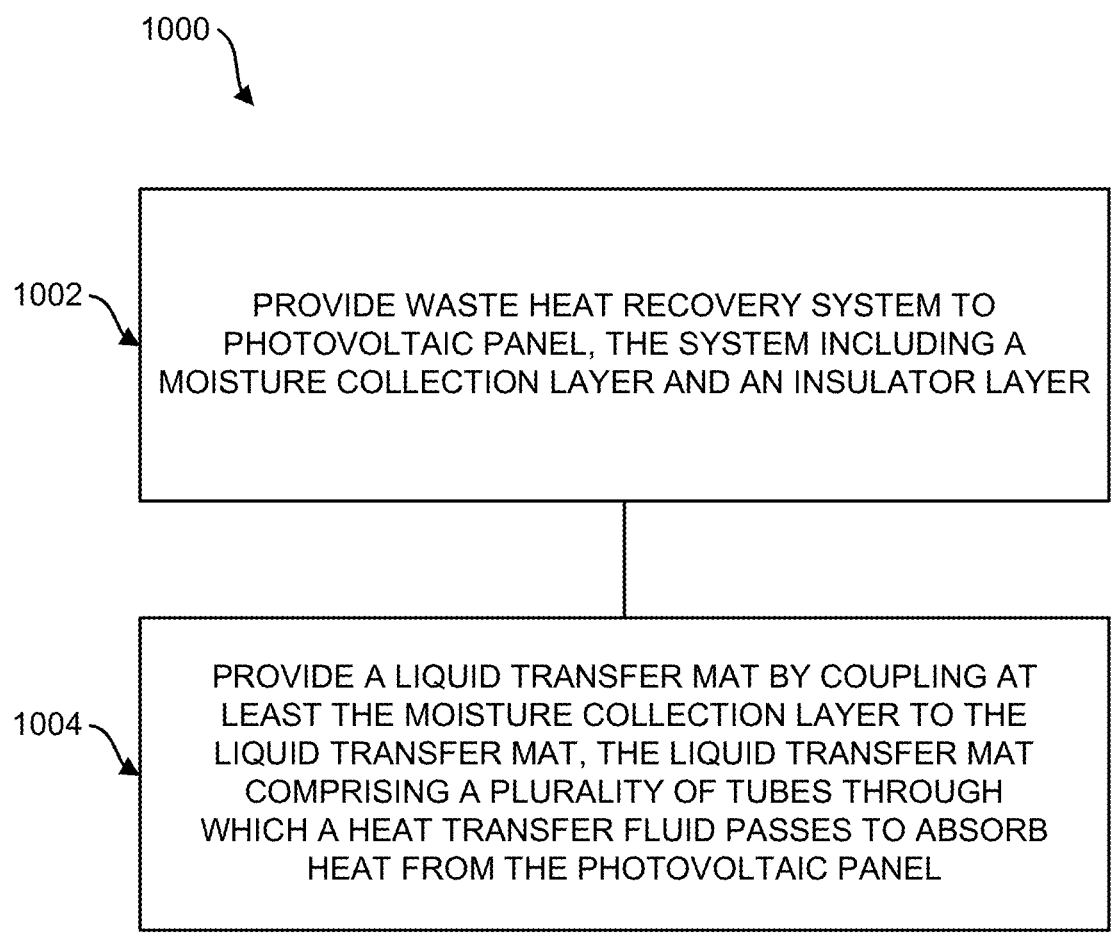
FIG. 10 is an example method of recovering heat from a photovoltaic panel consistent with implementations of the current subject matter.

FIG. 10 illustrates an example method 1000 of recovering heat from a photovoltaic panel, consistent with implementations of the current subject matter.

At 1002, a waste heat recovery system, such as the heat recovery system 100, may be provided to a photovoltaic panel, such as the energy dissipating receiver 20. For example, an open loop system 102 and/or a closed loop system 104 may be coupled to the photovoltaic panel. In some implementations, all or a portion of the heat recovery system 100, such as the moisture collection layer 40, the insulator layer 30, and/or the liquid transfer mat 50, may be coupled to the photovoltaic panel.

As described herein, the heat recovery system may include the moisture collection layer 40 and/or the insulator layer 30 (e.g., an electric insulator layer). The moisture collection layer 40 may include an open cell material configured to absorb moisture, such as moisture forming on one or more surfaces of the heat recovery system 100. The insulator layer 30 may separate the moisture collection layer from the photovoltaic panel. In some implementations, the moisture collection layer is configured to recover the heat from the photovoltaic panel, thereby reducing a temperature of the photovoltaic panel, reducing degradation of the panel, and/or improving heat transfer from the panel.

Figure 7:
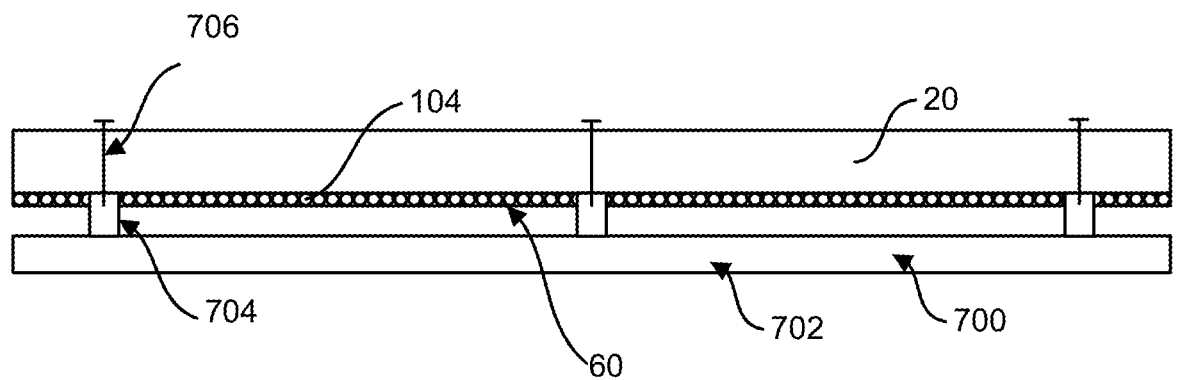
FIG. 7 is a side view of a heat recovery system consistent with implementations of the current subject matter.
Figure 8:
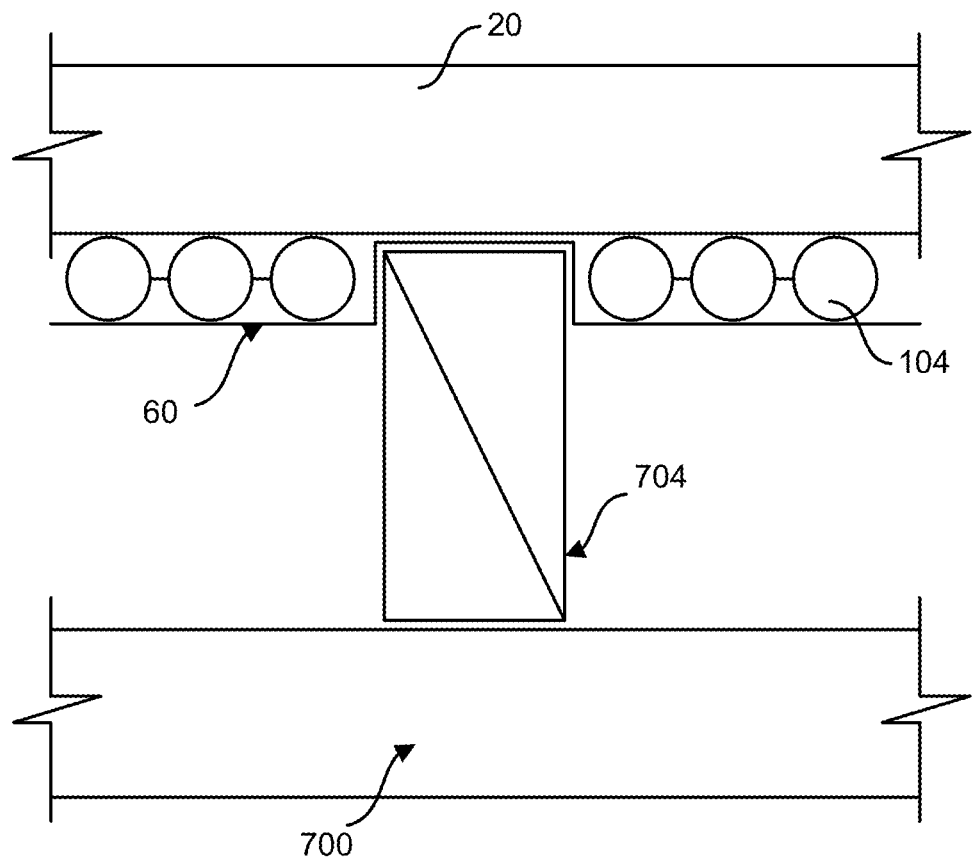
FIG. 8 illustrates a tray for a heat recovery system consistent with implementations of the current subject matter.

FIG. 7 and FIG. 8 illustrate examples of the energy recovery system 100 consistent with implementations of the current subject matter. As shown in FIG. 7, the energy recovery system 100 may be coupled to at least one panel bracket 700 that supports the energy recover system 100. The panel bracket 700 may include a base 702 and a support rail 704. The support rail 704 may be positioned between the base 702 and at least a portion of the energy dissipating receiver 20, the heat transfer layer 40, the liquid transfer mat 50, the backing layer 60, and/or another component of the energy recovery system 100. The support rail 704 may support the energy recovery system 100. In some implementations, the panel bracket 700 and/or the support rail 704 is coupled to the energy dissipating receiver 20. For example, a clamp 706 may be used to couple the panel bracket 700 and/or the support rail 704 to the energy dissipating receiver 102 and/or another component of the energy recovery system 100. Clamping the panel bracket 700 and/or the support rail 704 to the energy dissipating receiver 102 may help to ensure tight contact between the energy dissipating receiver 20 and the heat transfer layer 40 and/or the liquid dissipating mat 50, thereby improving heat transfer efficiency and/or cooling the energy dissipating receiver 20 more quickly. Such configurations, also allow for the coupling between the energy dissipating receiver 20 and the liquid transfer mat 50 and/or the heat transfer layer 40 to meet industry standards and/or codes, while achieving maximum heat transfer and fluid flow within at least the liquid transfer mat 50. Additionally, and/or alternatively, such configurations may ensure electrical grounding between the energy dissipating receiver 20, the backing 60 and/or the base 702, and the support rail 704, among other components.

FIG. 8 shows a close-up view of the energy recovery system 100 and the panel bracket 700 including the base 702 and the support rail 704. As shown in FIG. 8, the liquid transfer mat 50 may include a recess configured to receive at least a portion of the support rail 704. In other implementations, the support rail 704 is positioned between adjacent liquid transfer mats 50.

At 1004, a liquid transfer mat, such as the liquid transfer mat 50, may be provided. Providing the liquid transfer mat may include coupling the mat to the moisture collection layer. The liquid transfer mat may, as described herein, include a plurality of tubes through which a fluid passes to absorb heat from the photovoltaic panel. The moisture collection layer may thus encourage rapid heat transfer from the photovoltaic panel to the liquid transfer mat.

Although the disclosure, including the figures, described herein may described and/or exemplify these different variations separately, it should be understood that all or some, or components of them, may be combined.

Although various illustrative embodiments are described above, any of a number of changes may be made to various embodiments. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the claims.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. References to a structure or feature that is disposed "adjacent" another feature may have portions that overlap or underlie the adjacent feature.

Terminology used herein is for the purpose of describing particular embodiments only and is not intended to be limiting. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as, for example, "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings provided herein.

Throughout this specification and the claims which follow, unless the context requires otherwise, the word "comprise", and variations such as "comprises" and "comprising" means various components can be co jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" "or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, are possible.

In the descriptions above and in the claims, phrases such as, for example, "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A heat recovery system for a photovoltaic panel, the system comprising:
   an open loop system comprising a first side positioned adjacent to the photovoltaic panel, wherein the first side comprises a surface configured to contiguously contact a corresponding surface on the photovoltaic panel, the open loop system further comprising:
      an electric insulator layer spanning a length and a width of the open loop system and in contiguous contact with the corresponding surface of the photovoltaic panel, wherein the electric insulator layer comprises a flame retardant material; and
      a moisture collection layer having a first side adjacent to and in contiguous contact with the electric insulator layer and a second side adjacent to and in contiguous contact with a closed loop system, wherein the moisture collection layer comprises a material of one or more of a metal, a metallic mesh, an aluminum mesh, an aluminum material, a mineral wool material, an open cell dense foam, or a porous reticulated foam, the material comprising a plurality of surfaces for the collection of moisture, the moisture collection layer configured to collect moisture, and transfer heat from the photovoltaic panel and to direct moisture away from the photovoltaic panel,
      wherein the electric insulator layer is positioned between the corresponding surface of the photovoltaic panel and the moisture collection layer and is further configured to reduce the photovoltaic panel contacting the moisture collected by the moisture collection layer; and
   the closed loop system positioned adjacent to the open loop system at a second side of the open loop system opposite to the first side of the open loop system, the closed loop system comprising:
      a liquid transfer mat comprising a plurality of tubes through which a liquid passes to absorb heat generated by the photovoltaic panel;
      wherein the open loop system is configured to facilitate heat transfer from the photovoltaic panel to the closed loop system to reduce a temperature of the photovoltaic panel.

2. The system of claim 1, wherein the electric insulator layer comprises a thermoplastic membrane.

3. The system of claim 1, further comprising the photovoltaic panel, wherein the open loop system is positioned between the closed loop system and the photovoltaic panel.

4. The system of claim 3, wherein the photovoltaic panel comprises a first side configured to absorb solar energy; and a second side opposite the first side; wherein the open loop system is configured to contact the second side of the photovoltaic panel.

5. The system of claim 1, wherein the moisture collection layer is a heat transfer layer.

6. The system of claim 1, further comprising a drip system.

7. The system of claim 6, wherein the drip system is a low volume water drip line.

8. The system of claim 6, wherein the drip system is coupled to the moisture collection layer; and wherein the drip system is configured to allow remove the absorbed moisture to passively flow from the moisture collection layer.

9. The system of claim 8, wherein the drip system is at least partially embedded within the moisture collection layer.

10. The system of claim 6, wherein the drip system comprises a nozzle configured to allow the absorbed moisture to flow from the moisture collection layer.

11. The system of claim 10, wherein the nozzle is positioned inset relative to an outer end of the electric insulator layer.

12. The system of claim 1, wherein the liquid transfer mat comprises a flexible material and/or a rigid material.

13. The system of claim 1, further comprising a backing layer.

14. The system of claim 13, wherein the backing layer comprises an insulation material having a low thermal conductivity value, wherein the insulation material limits heat from escaping the liquid transfer mat.

15. The system of claim 13, wherein the backing layer is configured to support the liquid transfer mat.

16. The system of claim 13, wherein the backing layer is configured to support the closed loop system.

17. The system of claim 16, wherein the backing layer is further configured to support the open loop system.

18. The system of claim 1, wherein the liquid transfer mat is configured to absorb heat from the photovoltaic panel evenly across a surface of the photovoltaic panel.

19. The system of claim 12, wherein the liquid transfer mat comprises a plurality of tubes positioned adjacent to each other and flexibly coupled to each other.

20. The system of claim 19, wherein the plurality of tubes contact at least one other tube along a parallel length.

21. The system of claim 6, wherein the drip system is configured to introduce water to the moisture collection layer, wherein the introduced water is configured to facilitate heat exchange from the photovoltaic panel.

22. The system of claim 1, wherein the moisture collection layer material substantial fills an area between the insulator layer and the closed loop system.

23. The system of claim 1, wherein the moisture collection layer comprises a foam.

24. The system of claim 22, wherein the foam comprises an open cell foam.

25. The system of claim 1, wherein the moisture collection layer comprises a thickness between about 0.5 to 0.6 inches and the moisture collection layer continuously spans a corresponding surface of the photovoltaic panel.

26. A heat recovery system for a photovoltaic panel, the system comprising:
   an electric insulator layer configured to electrically insulate the photovoltaic panel, the electric insulator layer spanning a length and a width of the photovoltaic panel and in contiguous contact with a corresponding surface of the photovoltaic panel, wherein the electric insulator layer further comprises a flame retardant, and wherein the electric insulator insulates the photovoltaic panel from moisture collected by a moisture collection layer;
   the moisture collection layer comprising a first side positioned adjacent to the electric insulator layer, the moisture collection layer further comprising a plurality of surfaces configured for the collection of moisture, wherein the moisture collection layer is composed of an open cell material configured to absorb moisture; and a closed-loop liquid transfer layer comprising a plurality of tubes through which a liquid passes, the closed-loop liquid transfer layer positioned adjacent to a second side of the moisture collection layer;

wherein the moisture collection layer is configured to improve heat transfer from the photovoltaic panel to the closed-loop liquid transfer layer.

\* \* \* \* \*